United States Patent
Hou et al.

(10) Patent No.: US 8,026,899 B2
(45) Date of Patent: Sep. 27, 2011

(54) COMPUTER INPUT DEVICE HAVING MOVABLE LIGHT PERVIOUS PLATE

(75) Inventors: Ting-Teng Hou, Taipei County (TW); Hui-Chen Chang, Taipei County (TW)

(73) Assignee: Kye Systems Corp., Taipei (TW)

( * ) Notice: Subject to any disclaimer, the term of this patent is extended or adjusted under 35 U.S.C. 154(b) by 579 days.

(21) Appl. No.: 12/230,265

(22) Filed: Aug. 27, 2008

(65) Prior Publication Data
US 2009/0073122 A1 Mar. 19, 2009

(30) Foreign Application Priority Data
Sep. 14, 2007 (TW) ................................ 96134585 A

(51) Int. Cl.
*G09G 5/08* (2006.01)
(52) U.S. Cl. ....................................................... 345/163
(58) Field of Classification Search .......... 345/156–178; 463/37
See application file for complete search history.

(56) References Cited

U.S. PATENT DOCUMENTS

| 5,327,162 A * | 7/1994 | Soma ............................. 345/161 |
| 2005/0035946 A1* | 2/2005 | Wang ............................. 345/163 |
| 2008/0284735 A1* | 11/2008 | Shim ............................. 345/166 |

FOREIGN PATENT DOCUMENTS
TW 592353 6/2004
* cited by examiner

*Primary Examiner* — Chanh Nguyen
*Assistant Examiner* — James Nokham
(74) *Attorney, Agent, or Firm* — Bacon & Thomas, PLLC

(57) ABSTRACT

A computer input device includes a housing, a move tracking module, and a light pervious plate. The move tracking module is disposed in the housing, and emits a sensing light. The light pervious plate is movably disposed between the housing and the move tracking module, and may be moved between a first position and a second position relatively to the move tracking module. In this manner, the sensing light selectively penetrates the light pervious plate and is emits out of the housing, or is directly emits out of the housing, so that the computer input device correspondingly executes a touch mode or a mouse mode.

6 Claims, 7 Drawing Sheets

COMPUTER INPUT DEVICE HAVING MOVABLE LIGHT PERVIOUS PLATE

CROSS-REFERENCE TO RELATED APPLICATIONS

This non-provisional application claims priority under 35 U.S.C. §119(a) on Patent Application No(s). 096134585 filed in Taiwan, R.O.C. on Sep. 14, 2007 the entire contents of which are hereby incorporated by reference.

BACKGROUND OF THE INVENTION

1. Field of Invention

The present invention relates to a computer input device, and more particularly, to a computer input device which may be manipulated on a plane or by a finger.

2. Related Art

With the development and progress of technology, computer equipments, no matter the personal computers (PCs) or notebooks, have become indispensable tools for providing convenience in people's daily life or work. However, window interfaces of the computer equipments can only be manipulated through pointer input devices, such as a mouse, touchpad, and trackball.

For example, a mouse may be a wheel mouse or an optical mouse according to a manipulation method, which may smoothly control the position of a cursor on a computer screen. The wheel mouse moves to rotate the ball mounted in the bottom thereof, and a grating wheel for detecting a movement change generates a corresponding electronic movement signal, so as to control a movement position of the cursor. In an optical mouse, an optical sensor module mounted on the bottom emits a light, the light is reflected at the surface of an object into an optical sensor of the optical sensor module, so as to detect a change of the light reflected by the surface of the object, and generate a corresponding cursor movement signal. The optical mouse has become the mainstream in the current market.

In recent years, a touch control (TC) module capable of manipulating a cursor and executing a preset function is further developed to completely replace the functions of the optical sensor module and buttons of a conventional mouse. The touch control module is disposed in an upper housing of the mouse. A user may selectively manipulate the position of the cursor through the optical sensor module on the bottom of the mouse or slide a finger on the TC module to generate a corresponding control signal.

However, the mouse device with the touch control module has an excessively complicated circuit wiring since two pointer sensing modules (an optical sensor module on the bottom of the mouse and a TC module on the top of the mouse) are mounted therein at the same time, with results that the mouse is too bulky in size and appearance and cannot be thinned. In addition, in the manufacturing, the layout design of the components must be considered, such that the manufacturing processes are increased and the computer device has to be sold at a high price, which deviates from the current requirements of a light, thin, short, small, and cheap electronic device.

In order to solve the problems of the mouse device in which two pointer sensing modules are mounted at the same time, Taiwan Patent Publication No. 592353 has disclosed a dual-purpose optical pointer sensing device, which includes a main body, an optical sensor element, and a light pervious contact plate. The optical sensor element is embedded in the main body, and the light pervious contact plate is embedded above the optical sensor element to be touched by a finger of a user, so as to enable the optical sensor element emits a signal upward through the light pervious contact plate, obtain a variance of a moved image, and then control the movement of a cursor. Alternatively, the light pervious contact plate is removed from the optical pointer sensing device, and the optical pointer sensing device is moved on a plane object, so that the optical sensor element emits a signal downwards, obtains a variance of a changed image, and controls the movement of a pointer.

Although the optical pointer sensing device disclosed in Taiwan Patent Publication No. 592353 is provided with one pointer sensing module, when the optical pointer sensing device is moved on the plane object, the light pervious contact plate must be detached from the pointer sensing device. No receive space is designed for the main body of the pointer sensing device. When the light pervious contact plate is not used, a user will feel puzzled on how to keep the contact plate for it is easily lost, with a possible result that the optical pointer sensing device cannot be manipulated by a further due to lack of the light pervious contact plate.

SUMMARY OF THE INVENTION

In view of the problems, the present invention provides a computer input device, so as to solve the problems in the prior art that the light pervious contact plate cannot move relative to the main body, which causes inconvenience when the mouse performs the optical sensing operation in upward and downward directions as the light pervious contact plate has to be assembled to or disassembled from the main body of the mouse repeatedly, and the light pervious contact plate cannot be received easily.

The computer input device disclosed in the present invention includes a housing, a move tracking module, and a light pervious plate. The housing has an accommodation space and an opening formed at one side thereof. The move tracking module is disposed in the housing correspondingly to the opening, so that a sensing light of the move tracking module is emits out of the housing through the opening. The light pervious plate is disposed between the opening and the move tracking module, and may be moved between a first position and a second position relatively to the move tracking module.

When the light pervious plate is moved to the first position, the sensing light emitted from the move tracking module penetrates the light pervious plate and is emits to the outside through the opening, so that the computer input device performs a touch mode. When the light pervious plate is moved to the second position, the sensing light is directly emits from the opening, so that the computer input device performs a mouse mode.

The present invention has the efficacy that, the computer input device only needs one move tracking module, and employs a moving member to drive the light pervious plate to move. The computer input device may correspondingly perform the touch mode or the mouse mode without detaching the light pervious plate from the housing, thereby significantly reducing the manufacturing cost and manipulation steps, and solving the problems that the light pervious plate cannot be received and is easily lost when being not used.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The computer input device provided by the present invention includes, but not limited to, a computer peripheral input device such as a mouse, trackball, or game controller. In the following detailed description of the present invention, the mouse is taken as the most preferred embodiment. The accompanied drawings are for reference and illustration only, instead of limiting the present invention.

Figure 1A:
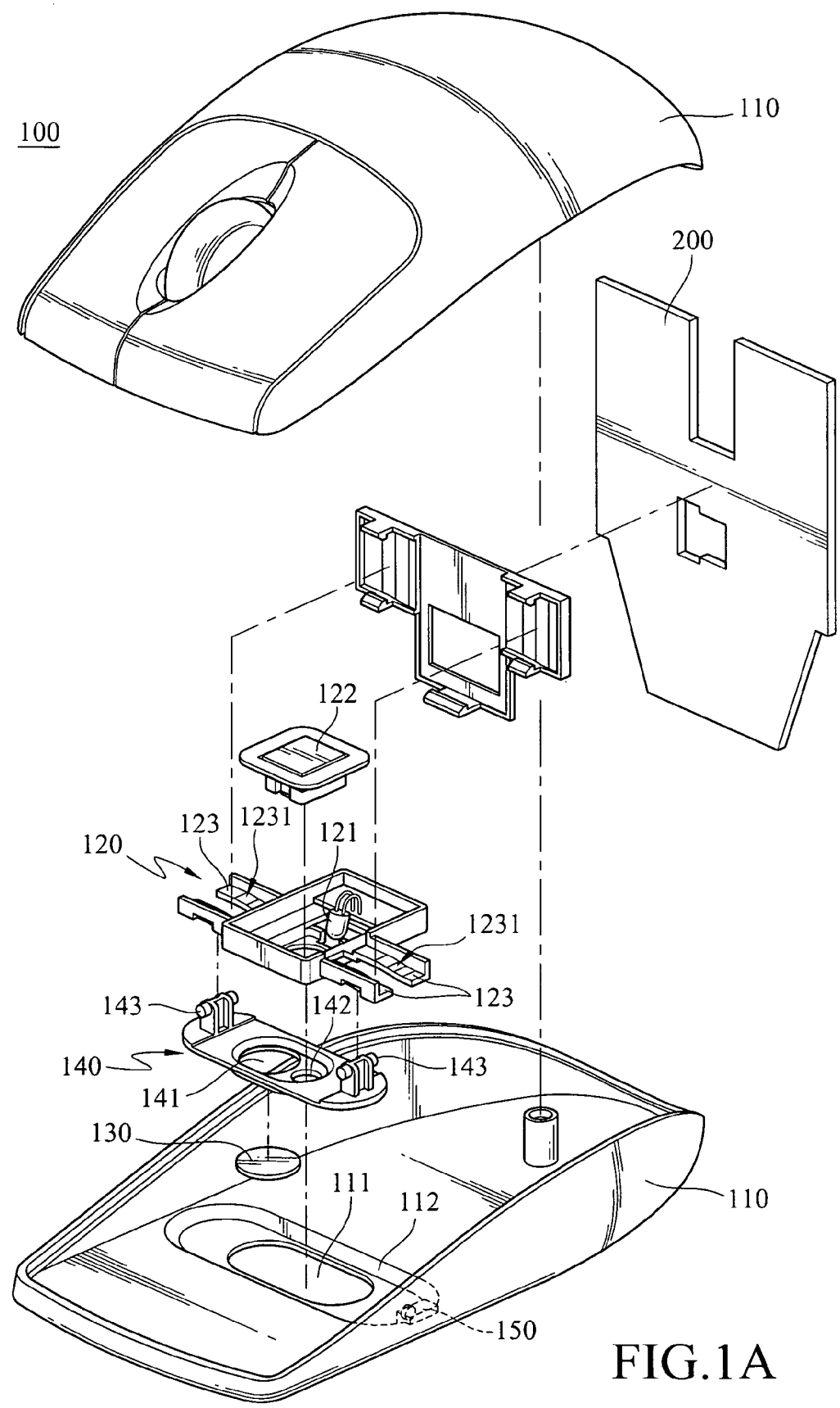
FIG. 1A is an exploded view of a first embodiment of the present invention.

FIG. 1A is an exploded view of a first embodiment of the present invention. The computer input device 100 disclosed in the first embodiment of the present invention includes a housing 110, a move tracking module 120, and a light pervious plate 130. The housing 110 has an accommodation space therein, an accommodation trough 112 is formed in the bottom surface of the housing 110, and an opening 111 is formed in the accommodation trough 112. The move tracking module 120 is disposed in the housing 110 and corresponding to the opening 111, and includes at least one light source 121 and at least one light sensor 122. A sensing light emitted by the light source 121 is projected on an object (for example, a plane or a finger of a user) and reflected to the light sensor 122, so as to calculate a relative movement between the object and the move tracking module 120 and generate a movement control signal. The method of detecting and calculating a movement at least includes an image detection mode or an optical detection mode, which will not be described in detail herein for not being the subject matter of the present invention.

The light source 121 of the move tracking module 120 may be a light emitting diode (LED) or any other light emitting element, so as to emit a directional light. The light sensor 122 may be a Charged Coupled Device (CCD) or a Complementary Metal-Oxide semiconductor (CMOS).

The computer input device 100 disclosed in the present invention further includes a moving member 140, which is movably disposed between the opening 111 and the move tracking module 120 and accommodated in the accommodation trough 112. The moving member 140 has a first through hole 141 and a second through hole 142. The light pervious plate 130 is disposed within the first through hole 141, and may be moved along with the moving member 140 between a first position and a second position relatively to the move tracking module 120. The light pervious plate 130 includes, but not limited to, any type of lens.

Further referring to FIG. 1A, a slide rail 123 respectively extends from the two opposite sides of the move tracking module 120 in the first embodiment of the present invention. The moving member 140 has two slide bars 143 at one side facing the move tracking module 120, and the slide bars 143 are corresponding to the slide rails 123. The slide bars 143 are movably disposed in the slide rails 123, respectively, so that the moving member 140 drives the light pervious plate 130 to move between the first position and the second position.

In addition, a protrusion 1231 is respectively further formed at one end of each of the two slide rails 123 corresponding to the first position. A switching switch 150 is disposed in the movement path of the moving member 140, and electrically connected to a circuit board 200 of the computer input device 100, so as to switch a manipulation mode of the computer input device 100.

Figure 1B:
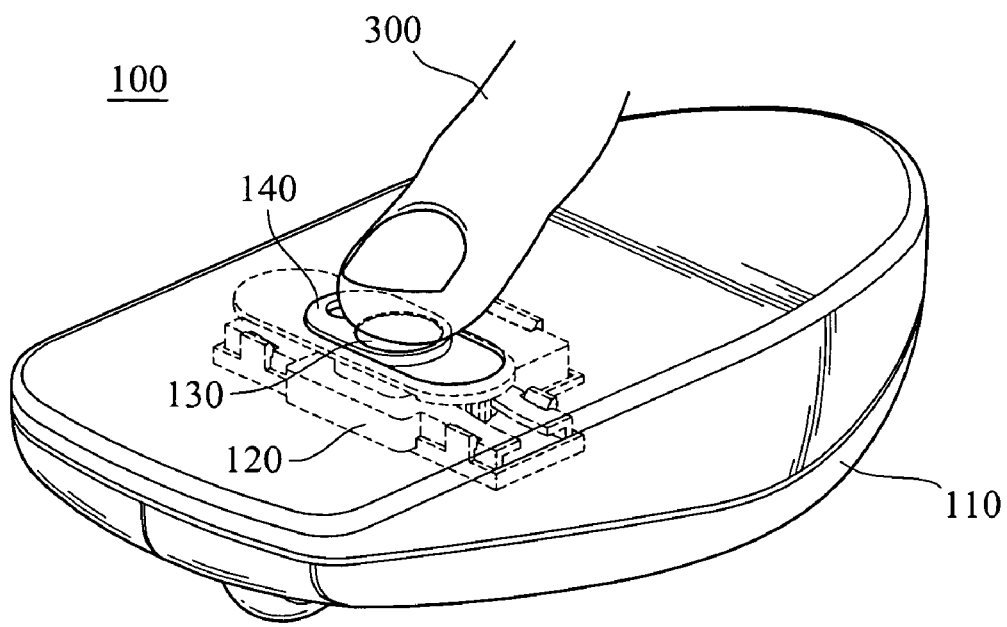
FIG. 1B is a schematic view of a touch mode according to the first embodiment of the present invention.
Figure 1C:
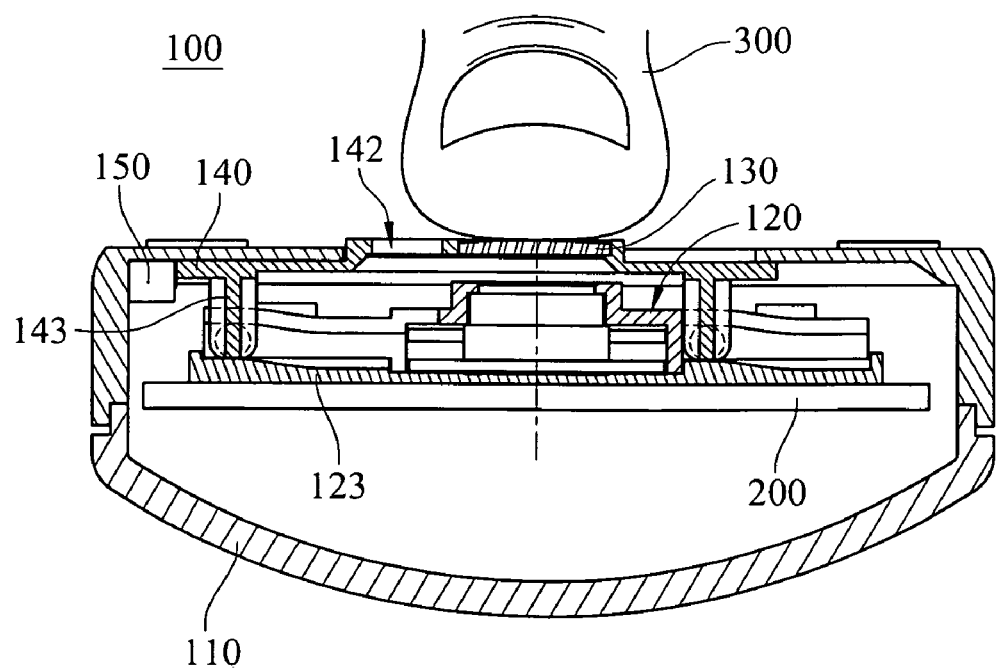
FIG. 1C is a cross-sectional view of the touch mode according to the first embodiment of the present invention.

Referring to FIGS. 1B and 1C, when the light pervious plate 130 is moved to the first position with the moving member 140 and corresponds to the move tracking module 120, the moving member 140 touches to press the switching switch 150 to generate an image change control signal to the computer input device 100. The computer input device 100 performs the touch mode which manipulates with the finger 300, and controls the movement direction of a cursor correctly. At the same time, the computer input device 100 is turned upward, the move tracking module 120 emits the sensing light upward, and the light source penetrates the light pervious plate 130 and is emits out of the housing 110 through the opening 111, so as to be projected onto the finger 300 sliding on the light pervious plate 130 and then reflected, thereby calculating a movement of the control cursor.

When the moving member 140 is moved to the first position, the moving member 140 is raised by a height due to the existence of the protrusion 1231, so that the light pervious plate 130 slightly protrudes from the housing 110, thereby forming a most appropriate optical focal length of the move tracking module 120. An object, such as the finger 300, on the surface of the light pervious plate 130 may be correctly imaged on the light sensor 122, so as to actually perform the action of the touch mode and avoid false actions. Furthermore, the light pervious plate 130 slightly protruding from the housing 110 also provides convenience for the finger 300 of the user to slide thereon for manipulation.

Figure 1D:
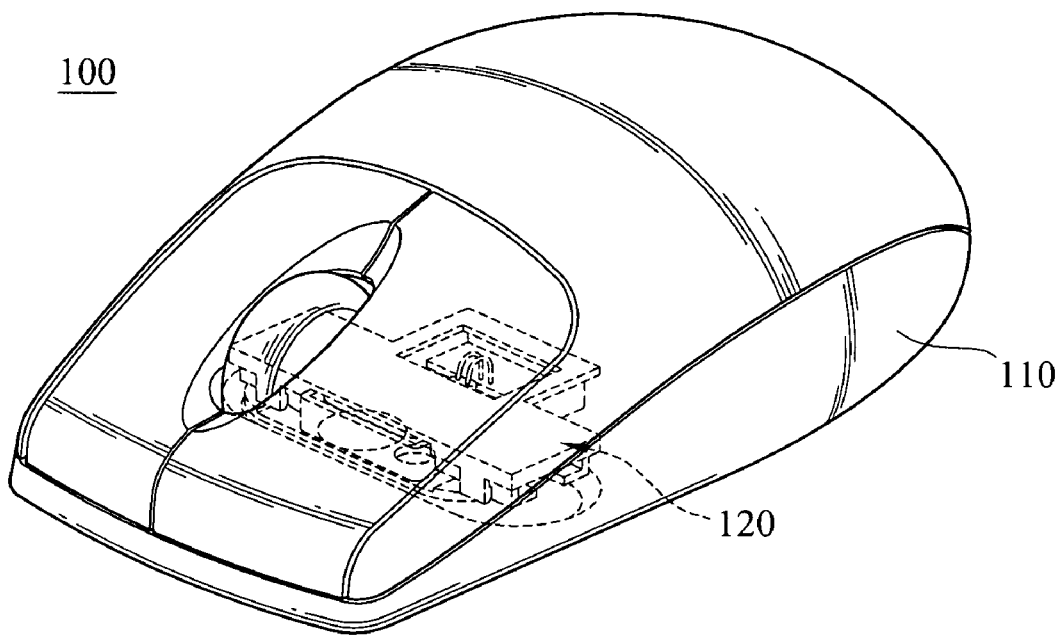
FIG. 1D is a schematic view of a mouse mode according to the first embodiment of the present invention.
Figure 1E:
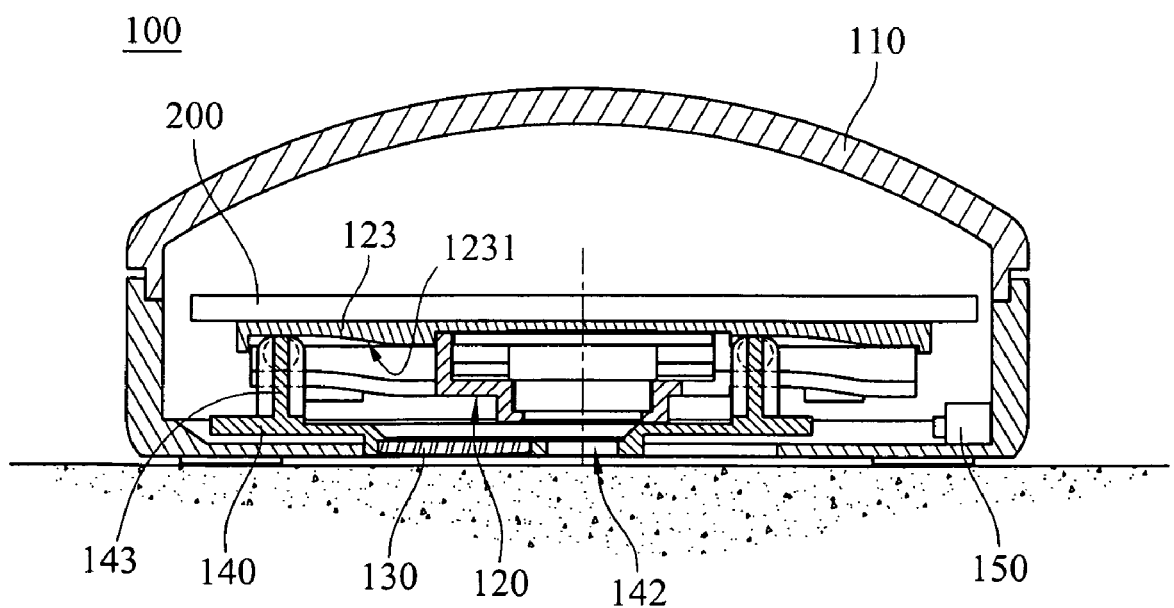
FIG. 1E is a cross-sectional view of the mouse mode according to the first embodiment of the present invention.

Referring to FIGS. 1D and 1E, when the moving member 140 is moved to the second position, the second through hole 142 is made to correspond to the move tracking module 120, the moving member 140 is separated from the switching switch 150 to generate an oppositely modified image control signal to the computer input device 100, such that the computer input device 100 performs the mouse mode which manipulates on a plane. At this time, the move tracking module 120 is turned downward, and the emitted sensing light directly penetrates the opening 111 and is emits out of the housing 110, so as to be projected onto a working plane and reflected, thereby calculating a physical movement of the computer input device 100 sliding on the place and then controlling the movement of the cursor on the computer pane.

Figure 2A:
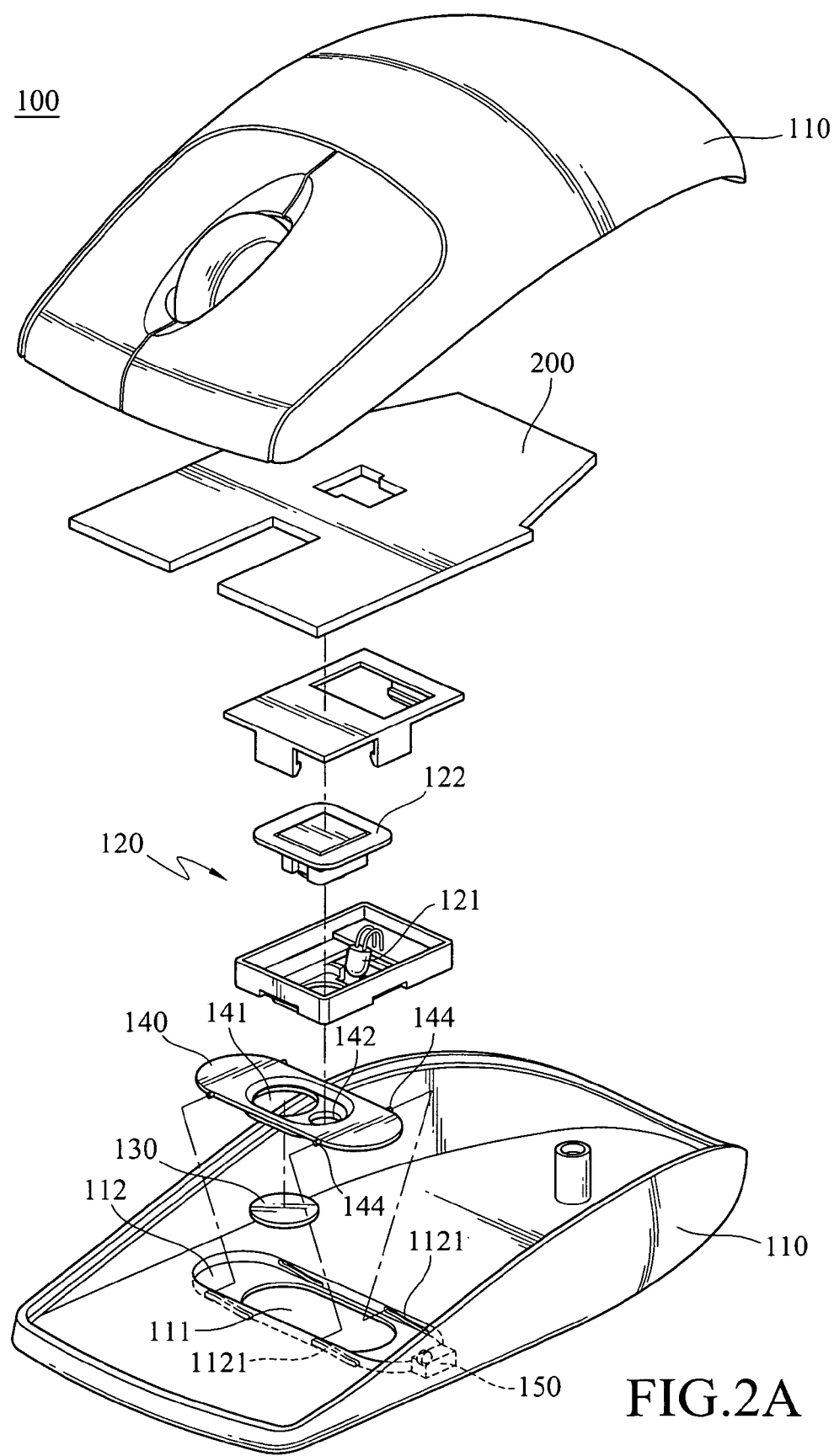
FIG. 2A is an exploded view of a second embodiment of the present invention.
Figure 2B:
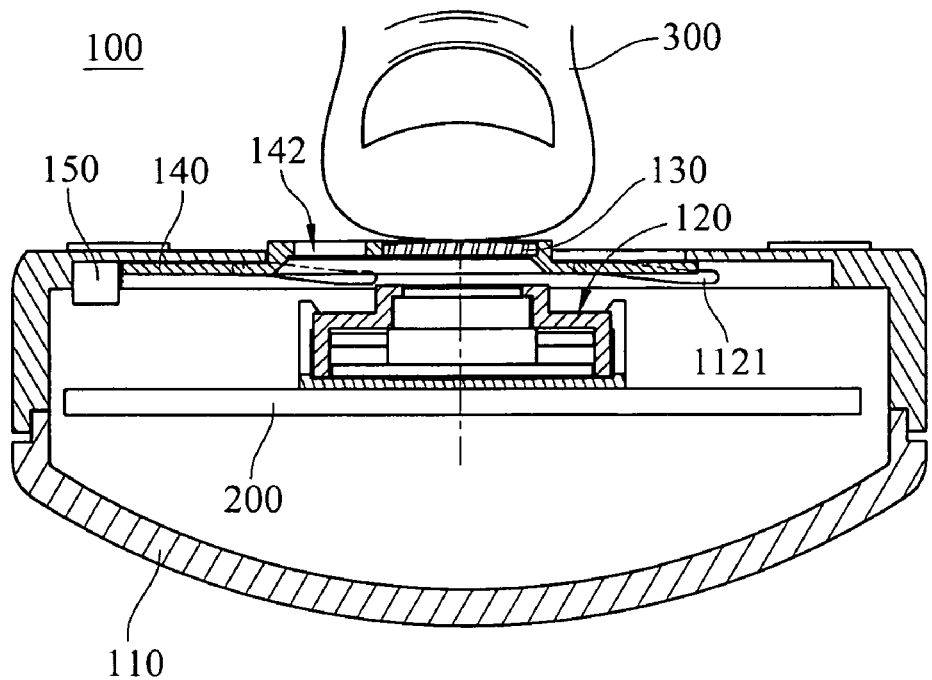
FIG. 2B is a cross-sectional view of a touch mode according to the second embodiment of the present invention.
Figure 2C:
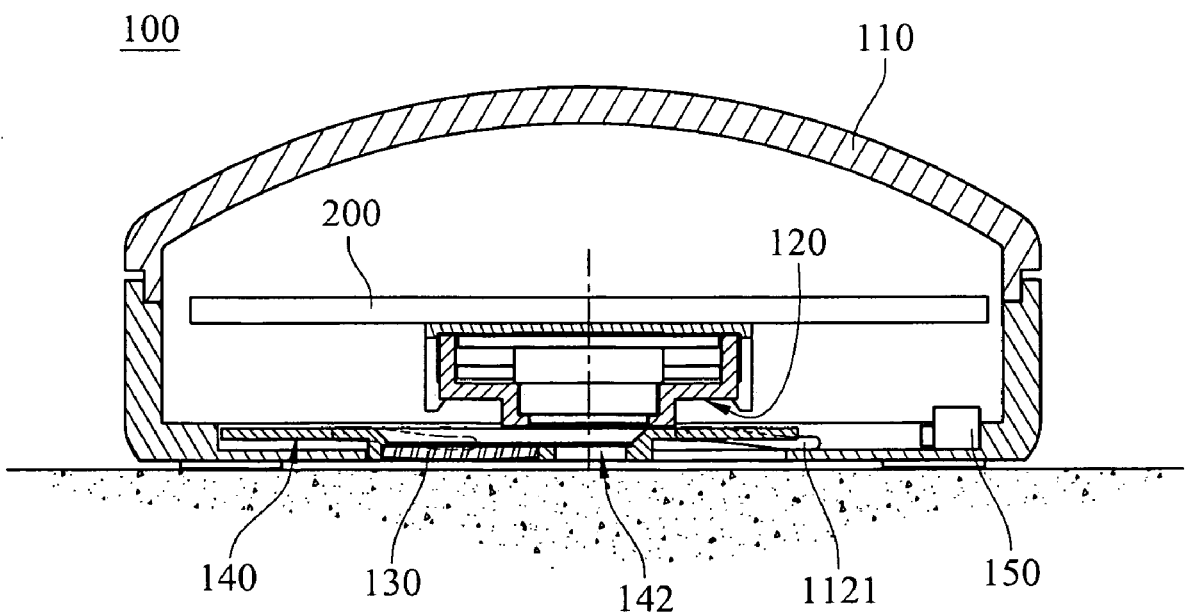
FIG. 2C is a cross-sectional view of a mouse mode according to the second embodiment of the present invention.

FIGS. 2A-2C are schematic views of a second embodiment of the present invention. Besides the moving aspect disclosed in the first embodiment, the light pervious plate 130 in the present invention may further be designed to be a moving mechanism disclosed in the second embodiment of the present invention. A sliding slot 1121 is recessed in the two opposite sides of the accommodation trough 112 in the second embodiment of the present invention, and a length of the sliding slot 1121 between two ends thereof is equal to the length between the first position and the second position. A protruding shaft 144 is respectively formed at two sides of the moving member 140 correspondingly to the two sliding slots 1121. The protruding shafts 144 are inserted into the sliding slots 1121 respectively and slide along the sliding slots 1121, so that the moving member 140 moves relatively to the move tracking module 120 to be positioned at the first position or the second position, and thus the computer input device 100 performs the touch mode or the mouse mode correspondingly.

Figure 3A:
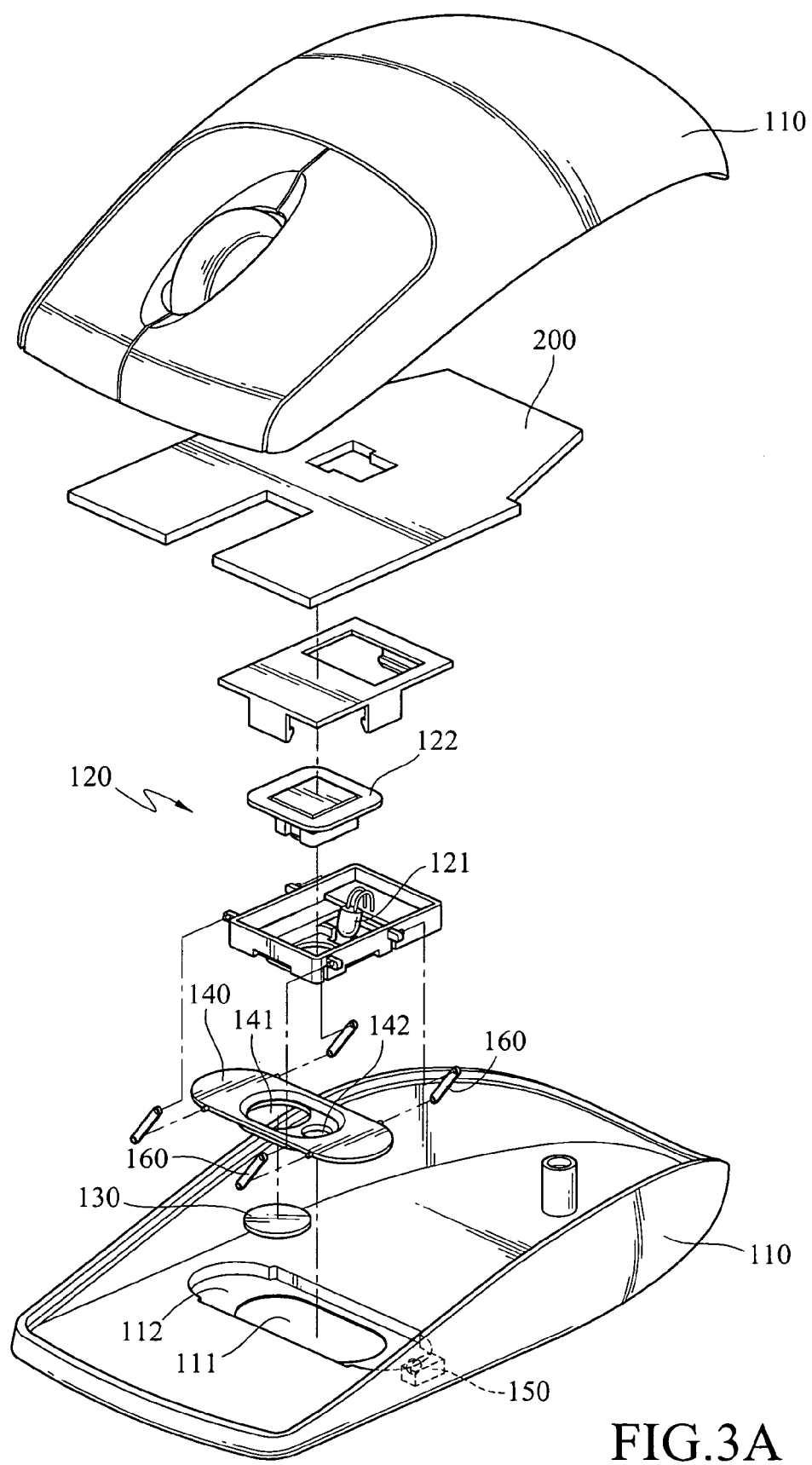
FIG. 3A is an exploded view of a third embodiment of the present invention.
Figure 3B:
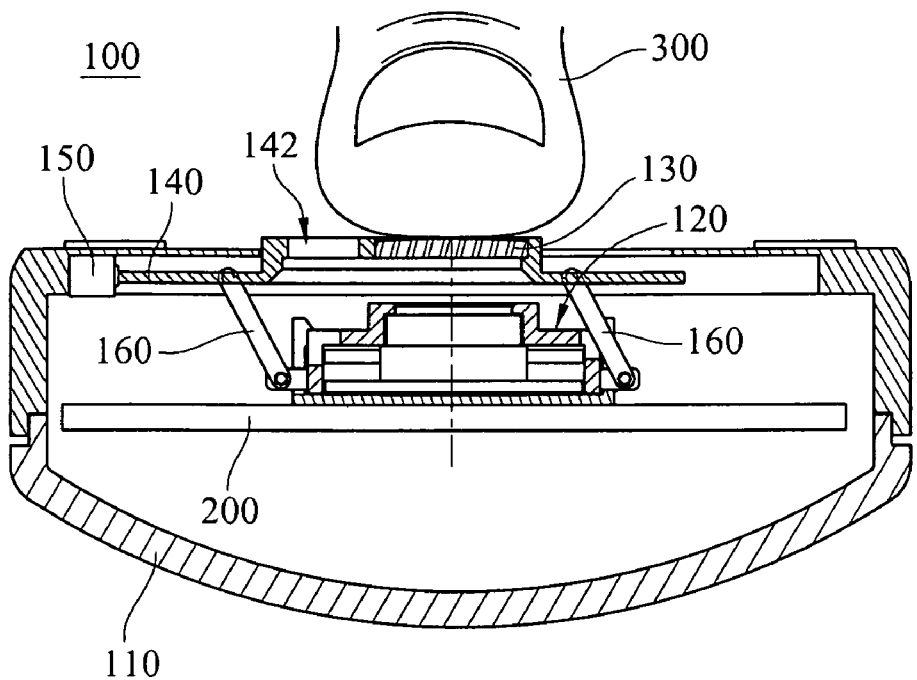
FIG. 3B is a cross-sectional view of a touch mode according to the third embodiment of the present invention.
Figure 3C:
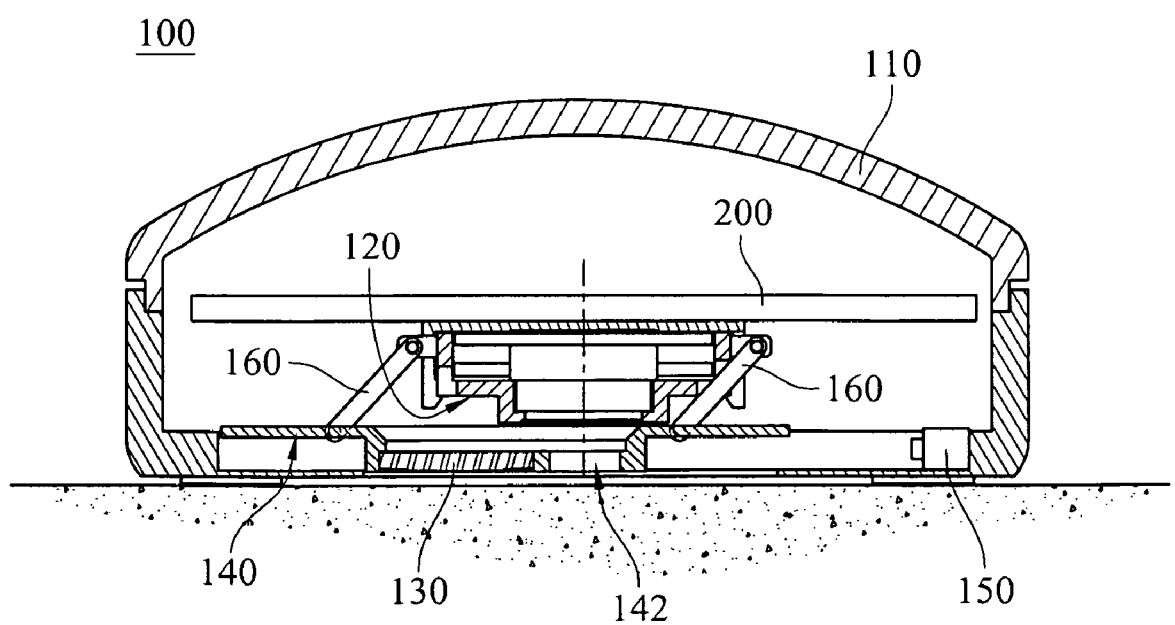
FIG. 3C is a cross-sectional view of a mouse mode according to the third embodiment of the present invention.

FIGS. 3A-3C are schematic views of a third embodiment of the present invention. The moving member 140 in the present invention may be movably connected to the move tracking module 120 through two connecting rods 160. The two ends of each of the connecting rods 160 disclosed in the third embodiment of the present invention are connected to the moving member 140 and the move tracking module 120, respectively, so that the moving member 140 may be moved between the first position and the second position relatively to the move tracking module 120, and thus the computer input device 100 performs the touch mode or the mouse mode correspondingly.

In the computer input device of the present invention, in order to actuate the touch mode or the mouse mode, only the moving member is required to drive the light pervious plate to move to a corresponding position without detaching the light pervious plate from the housing repeatedly, so that the user may switch the manipulation mode rapidly and conveniently, and at the same time, the problems that the light pervious plate cannot be received and is easily lost are solved.

What is claimed is:

1. A computer input device, comprising:
   a housing, having an accommodation space and an opening disposed at one side of the housing;
   a move tracking module, disposed in the housing and corresponding to the opening, so that a sensing light of the move tracking module is emits toward the opening; and
   a moving member, disposed between the opening and the move tracking module, and movable relatively to the move tracking module; wherein the moving member has a first through hole and a second through hole, a light pervious plate is disposed within the first through hole; and the moving member and the light pervious plate are movable between a first position and a second position relatively to the move tracking module;
   wherein when the light pervious plate is moved to the first position, the sensing light penetrates the light pervious plate and is emits out; and when the light pervious plate is moved to the second position, the sensing light is emits out from the second through hole.

2. The computer input device according to claim 1, furthering comprising a switching switch, disposed in a movement path of the moving member, wherein when the light pervious plate is moved to the first position, the moving member touches to press the switching switch such that the computer input device performs a touch mode.

3. The computer input device according to claim 1, wherein a slide rail is respectively disposed in two opposite sides of the move tracking module, the moving member has two slide bars corresponding to the two slide rails, the slide bars are slidably mounted in the slide rails, respectively, so that the moving member is movable relatively to the move tracking module.

4. The computer input device according to claim 3, wherein a protrusion is formed at one end of each of the two slide rails corresponding to the first position, so that when the light pervious plate is disposed at the first position and at the second position, the light pervious plate is disposed at different heights with a height difference.

5. The computer input device according to claim 1, wherein the housing further has an accommodation trough for accommodating the moving member, two opposite sliding slots are recessed in the accommodation trough, the moving member has two protruding shafts corresponding to the sliding slots, the two protruding shafts are inserted into the two sliding slots to slide along the sliding slots, so that the moving member moves relatively to the move tracking module.

6. The computer input device according to claim 1, further comprising two connecting rods, wherein the two ends of each of the two connecting rods are connected to the moving member and move tracking module, respectively, and the moving member moves relatively to the move tracking module through the connecting rods.

* * * * *